W. G. GROOM.
CORER.
APPLICATION FILED MAR. 1, 1913.
1,191,588.
Patented July 18, 1916.
3 SHEETS—SHEET 1.
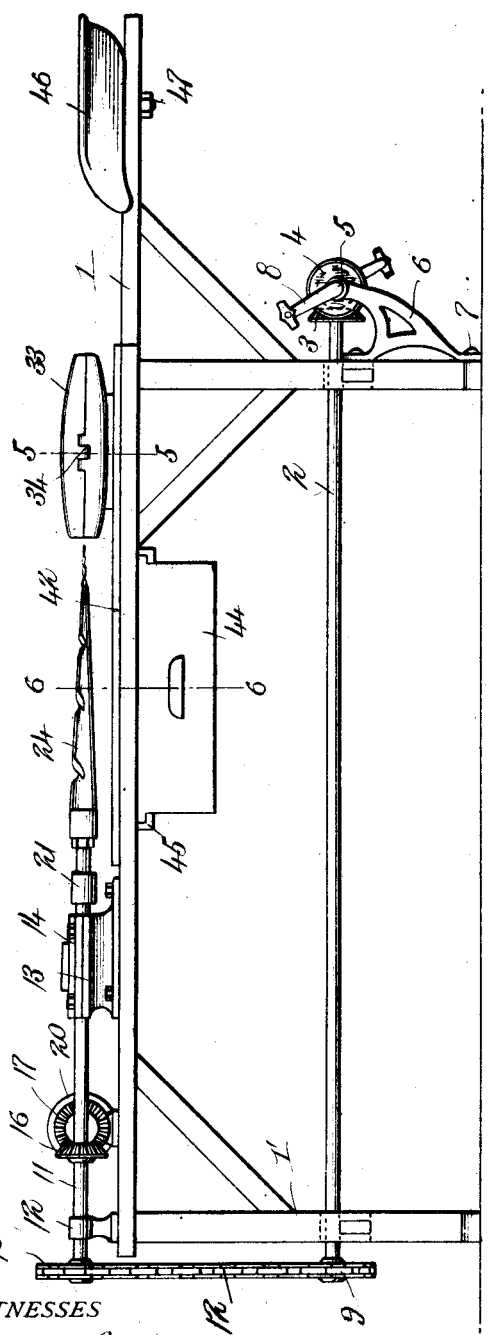
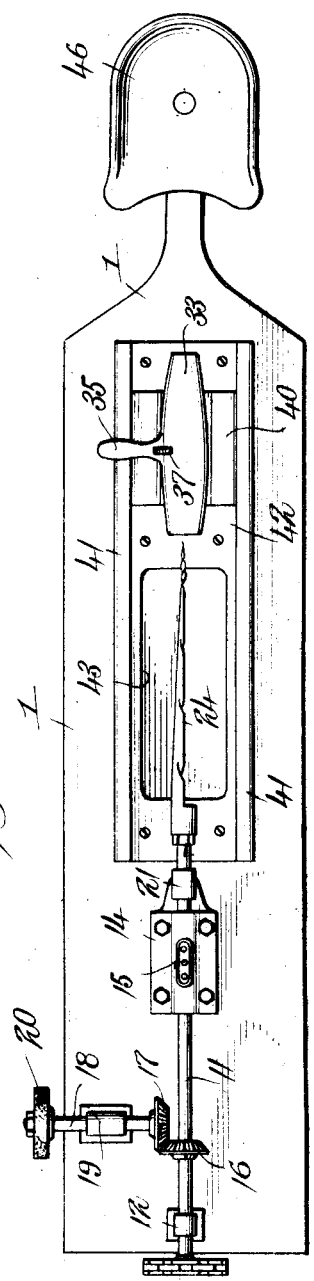
WITNESSES
INVENTOR W. G. GROOM.
CORER.
APPLICATION FILED MAR. 1, 1913.
1,191,588.
Patented July 18, 1916.
3 SHEETS—SHEET 2.
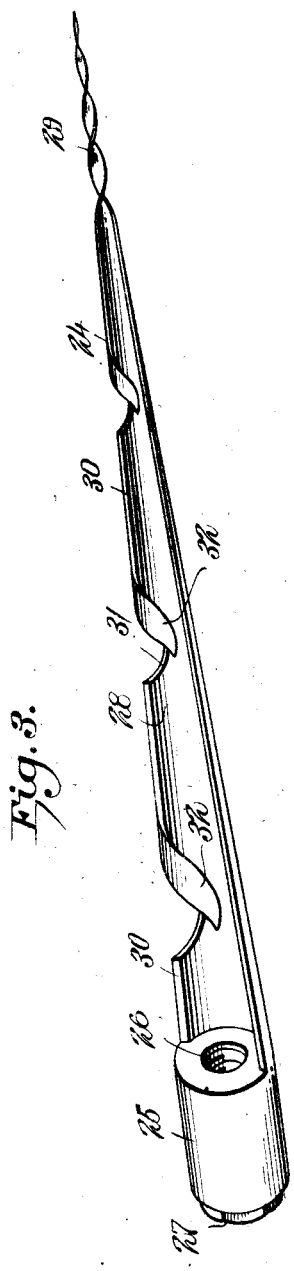
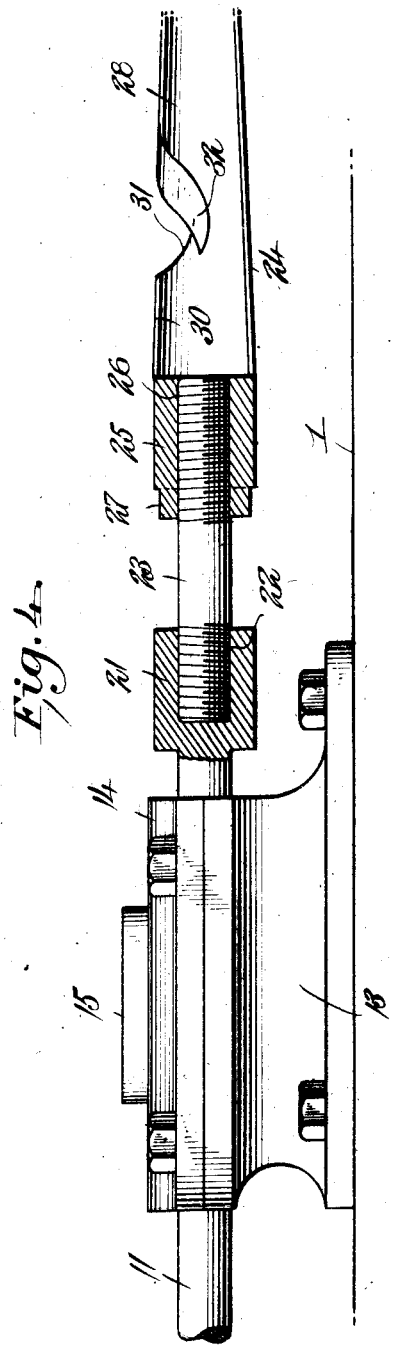
WITNESSES
INVENTOR

W. G. GROOM.
CORER.
APPLICATION FILED MAR. 1, 1913.

1,191,588.

Patented July 18, 1916.
3 SHEETS—SHEET 3.

WITNESSES

INVENTOR
Wesley G. Groom
Attorney

UNITED STATES PATENT OFFICE.

WESLEY G. GROOM, OF STORM LAKE, IOWA.

CORER.

1,191,588.   Specification of Letters Patent.   Patented July 18, 1916.

Application filed March 1, 1913. Serial No. 751,608.

*To all whom it may concern:*

Be it known that I, WESLEY G. GROOM, citizen of the United States, residing at Storm Lake, in the county of Buena Vista and State of Iowa, have invented certain new and useful Improvements in Corers, of which the following is a specification.

This invention relates to improvements in corers.

The primary object of the invention contemplates the provision of such a device, wherein the core of an ear of corn may be quickly and conveniently removed or extracted, thereby ventilating and drying the cob and conditioning the corn for subsequent use as seed when so desired.

A further object of the invention resides in the provision of a coring device, capable of entirely removing the core from an ear of corn, extracting the sap contained within the cob, and removing the pith, which operation allows a free circulation of air within the interior of the cob, completely drying the corn and preventing deterioration thereof and thus eliminating to a great extent the painstaking care now necessary in preparing corn for subsequent planting.

A still further object of the invention is to provide means for conveniently operating the coring device, and for varying the size, shape and length of the cob bore as desired.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 5:
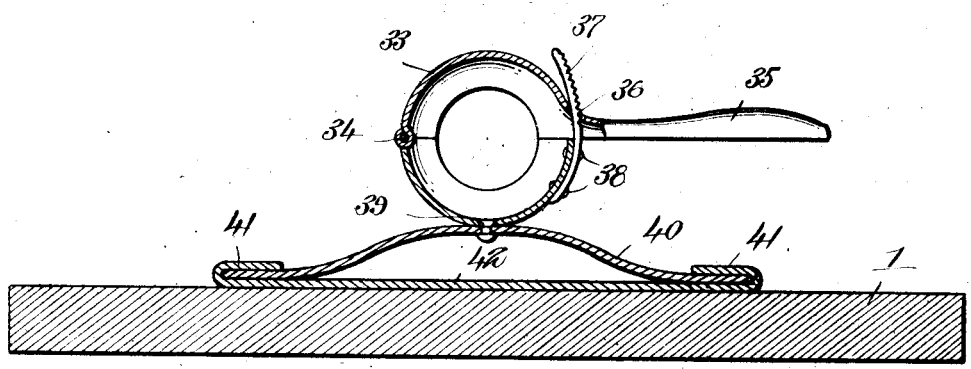
Figure 6:
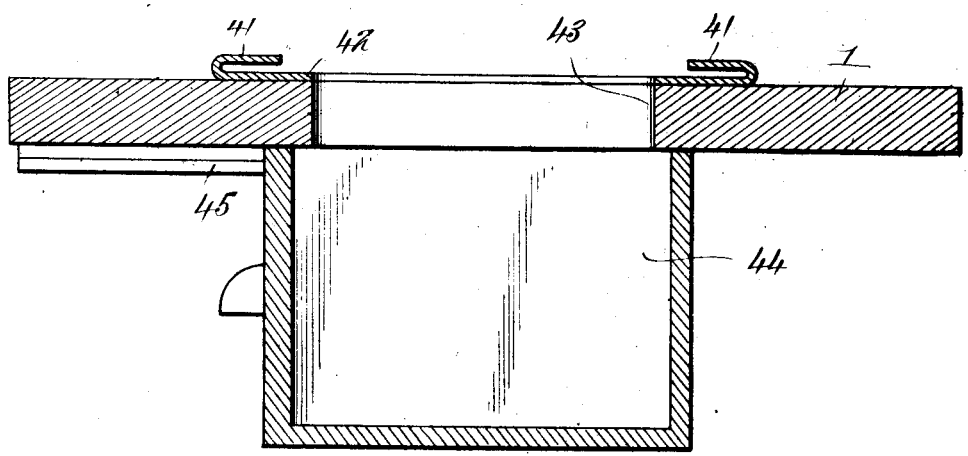
Figure 7:
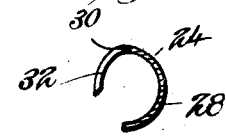

Figure 1 is a side elevation of a coring machine constructed in accordance with my invention. Fig. 2 is a top plan view of the same. Fig. 3 is an enlarged detail perspective view of the bit. Fig. 4 is an enlarged elevation, parts being shown in section illustrating the manner in which the bit is connected to the operating means. Fig. 5 is an enlarged section on line 5—5 of Fig. 1. Fig. 6 is an enlarged section on line 6—6 of Fig. 1, and Fig. 7 is a detail cross sectional view of the bit.

Before proceeding with the description of the drawings, I desire to call particular attention to the fact that while I have evolved my invention with particular reference to the treating of corn, the same can be readily utilized for various other purposes wherein the heart or core of an article or commodity is desired to be removed or extracted.

Referring now to the drawings, wherein is illustrated the preferred form of my invention, the numeral 1 designates a suitable stand or supporting structure of any convenient size, shape and material, upon which the device or machine is mounted. Mounted upon the stand and extending longitudinally thereof I provide a shaft 2, one end of which terminates in a beveled gear 3, meshing with a similar beveled gear 4 keyed or otherwise secured upon a suitable shaft 5 journaled within a bracket 6 secured as at 7 upon one of the uprights of the stand or supporting structure 1. Pedals 8, may be secured to the shaft 5 for rotating the same, and for operating the device. Although pedals have been shown in the drawings as the preferred means for operating the device, any other means may be employed for imparting movement to the said shaft 2. Keyed or otherwise secured upon the opposite end of the shaft 2 is a sprocket wheel 9 connected to a second sprocket wheel 10 secured upon one end of a shaft 11 through the medium of a suitable chain 12, for imparting movement from the said shaft 2 to the shaft 11. The shaft 11 is supported upon the top of the supporting structure 1 by means of a small bearing 12 and a large bearing 13, the latter having a removable top 14 and a lubricating device 15 formed thereupon. Secured to the shaft 11 and rotatable therewith between the said bearings 12 and 13, I provide a beveled gear 17, secured to the end of a transversely extending shaft 18 journaled as at 19 upon the top of the supporting structure 1. The opposite end of this shaft 18 is provided with a detachable emery wheel 20, the purpose of which will be hereinafter fully described.

If desired, a crank handle (not shown) may be employed in connection with the shaft 18 for operating the entire machine by hand.

The opposite end of the shaft 11 from that of the sprocket wheel 10 is provided with a head 21 having a screw threaded recess 22 formed therein, the said recess adapted to receive one end of a screw threaded shank 23 upon which the bit (designated in its entirety) 24 is mounted, the inner or large end of the said bit having a head 25 provided with a screw threaded bore 26 within which the opposite screw threaded end of the said shank 23 is fitted. A polygonal head 27 is formed integrally with the said head 25 to facilitate the screwing and unscrewing of the bit upon the shank.

From the head 25, the bit proper 28 projects, the said bit comprising a semicylindrical tapering body portion terminating in a point 29 shaped similar to that of the ordinary carpenters' bit. From the head 28 the said bit tapers or converges toward the point 29, one edge of the body portion of the bit being sharpened as at 30 and provided with a plurality of spaced apart cut out portions 31 from which curved tongues 32 project, the said tongues being curved inwardly and over the hollow of the said body portion as is clearly shown in Fig. 3 of the drawings, the edges of the said tongue being sharpened to cut and remove the pit of the corn cob during the boring operation of the device, as well as to extract the pith during the removal of the cob from the said bit.

Adjustably mounted upon the top of the supporting structure 1 I provide a casing 33 cylindrical in shape and comprising an upper and lower portion hingedly connected as at 34 to permit access to the interior of the said casing. A handle 35 is formed integrally with the upper portion of the said casing and projects laterally therefrom, the said handle having an opening 36 near its inner end through which a spring tooth rack 37 normally extends, the toothed face of the said rack engaging one edge of the opening 36 for holding the upper portion tightly closed during the operation of the device, as the said toothed rack is secured as at 38 to the lower portion of the casing 33. The casing 33 is secured as at 39 upon the upper face of a spring plate 40 slidably mounted within and beneath the curved edges 41 of a base plate 42 in turn permanently secured upon the upper face of the said supporting structure. By reason of this particular construction, it will be seen that the spring plate 40 will compensate for varying sizes of work by permitting the vertical centering of the holder with respect to the corer, thereby insuring the efficient operation of the device at all times.

The base plate 42 as well as the top of the supporting structure 1 is provided with an opening 43 through which the core or heart extracted during the operation of the device is free to pass, the said opening being disposed directly beneath the bit 24. A receptacle, in the form of a draw 44 is removably mounted upon the under face of the said top 1 of the supporting structure through the medium of guide bars 45, the said receptacle adapted to contain and catch the core and other waste material as it is extracted from the article acted upon.

An operator seat 46 is secured as at 47 at one end of the structure 1 to permit operation of the pedals 6. This method of operation may, however, be dispensed with and other motive power applied without in any way affecting the utility of the device.

In operation, the ear of corn to be acted upon is first placed within the casing 33, the upper portion of the said casing being raised by the lifting of the handle 35. After placing the ear within the casing as desired the said handle is lowered and locked by the engagement between the toothed face of the rack 37 and the opening 36 thereby firmly holding the corn ear in operative position. The entire casing is then slid upon the base plate 42 until the end 29 of the bit is brought into engagement with the corn ear, whereupon the simultaneous rotation of the bit and the movement of the casing will effect the desired boring operation. By sliding the casing until the end 29 of the bit extends entirely through the cob, the entire heart or core of the same is completely removed, and extracted by withdrawing the corn ear from engaging the said bit 24, the tongues 32 enabling the extraction of the core during the said sliding movement of the casing 33.

Pith and other waste core material is collected within the receptacle 44 provided for that purpose, and later removed as desired. The emery wheel 20, operated by the rotation of the shaft 11 is mounted upon the supporting structure 1 for the purpose of sharpening the cutting edge 30 of the bit when the same becomes dulled by constant use.

It will be seen from the above, taken in connection with the accompanying drawings that the entire core and heart of the corn ear is removed by the bit 24, thereby allowing a free circulation of air within the interior of the cob; that the size of the bore may be varied as desired; and that the danger of cutting or otherwise injuring the hands of the operator is completely avoided by the provision of the casing 33 within which the corn ear to be acted upon is placed and contained during the entire operation of the core extraction.

While I have shown and described a specially devised bit in connection with this invention, I do not wish to limit myself to such, as various forms may be employed without departing from the spirit of the invention, or if desired the bit as shown herein may be employed in connection with an ordinary brace, operated by hand, and in this manner used for the purpose of removing the heart of the corn cob.

It will be understood that the above description and accompanying drawings comprehend only the general and preferred embodiment of my invention, and that various minor changes in the details of construction, proportion and arrangement of parts may be made within the scope of the appended claim and without sacrificing any of the advantages of my invention.

Having thus fully described my invention, what I claim as new and desire to secure by Letters Patent, is:—

The combination with a coring machine including a rotatable corer and operating means therefor; of a plate having longitudinally disposed guides, a resilient plate having a centrally located upwardly bowed portion, the longitudinal edge portions of said resilient plate being disposed in said guides, and a work holder fixed to the bowed portion of said resilient plate in alinement with said corer; whereby said resilient plate will compensate for varying sizes of work by permitting the centering of said holder with respect to the corer.

In testimony whereof I affix my signature in presence of two witnesses.

WESLEY G. GROOM.

Witnesses:
C. C. DENIS,
FRED SCHALLER.